Dec. 10, 1929.   G. M. EATON   1,739,130
FLEXIBLE GEAR
Filed April 8, 1924
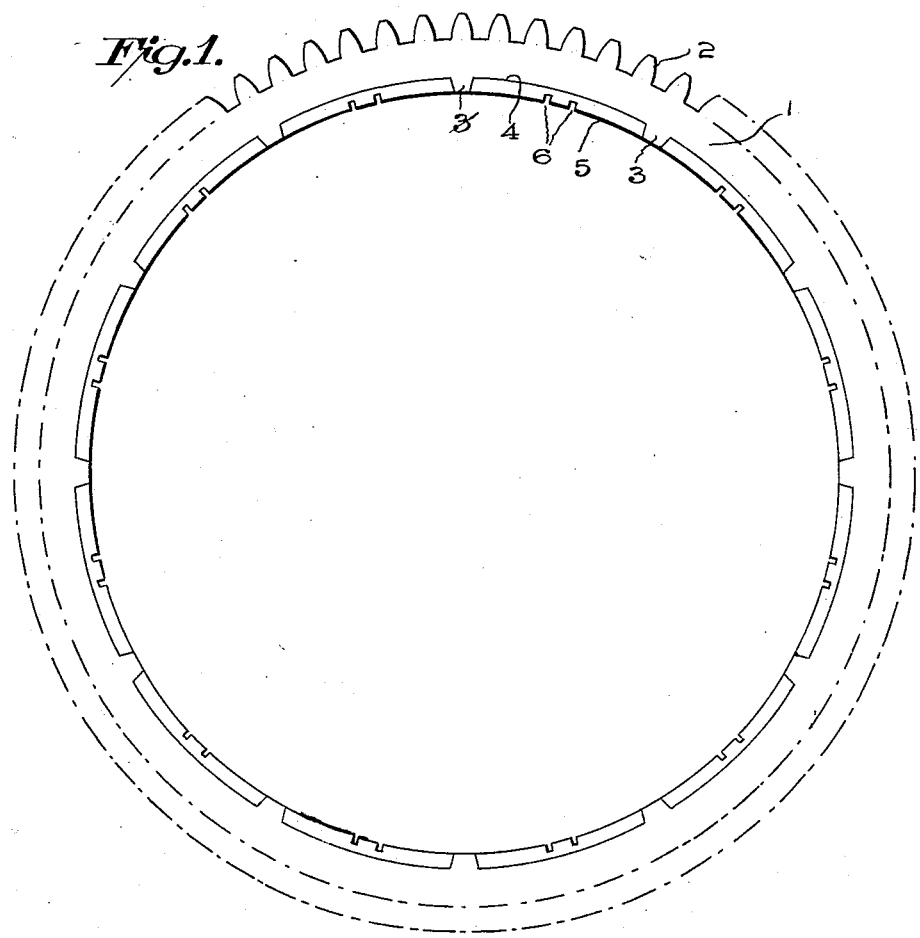
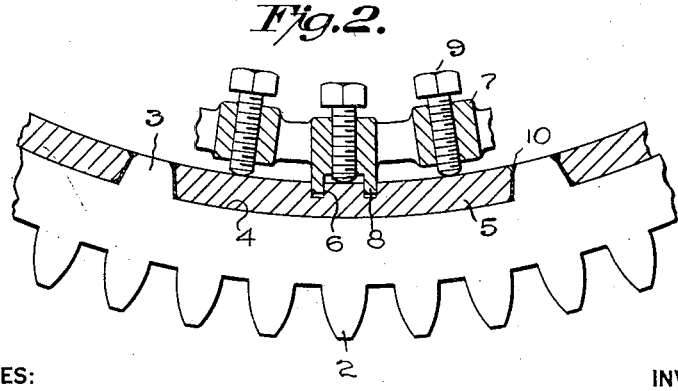
WITNESSES:
R. S. Harrison
W. B. Jaspert.
INVENTOR
George M. Eaton
BY
Wesley G. Carr
ATTORNEY Patented Dec. 10, 1929

1,739,130

UNITED STATES PATENT OFFICE

GEORGE M. EATON, OF WILKINSBURG, PENNSYLVANIA, ASSIGNOR TO WESTINGHOUSE ELECTRIC & MANUFACTURING COMPANY, A CORPORATION OF PENNSYLVANIA

FLEXIBLE GEAR

Application filed April 8, 1924. Serial No. 704,982.

My invention relates to gear-wheels, more especially to a novel type of gear rim construction for flexible gear elements of the type comprising a rim and hub member which are relatively movable and have flexible elements interposed therebetween.

It is among the objects of my invention to provide a gear rim of special construction to facilitate heat treatment and prevent distortion during such process.

It is a further object of my invention to provide a gear rim which may be utilized in conjunction with a supporting hub structure and engaging spring elements in which the spring landings are manufactured independently of the rim member and are assembled and secured to the latter by novel means.

It is still a further object of my invention to provide a gear rim construction in which the spring landings are removable and adapted to special heat-treatment for the service requirements to which that portion of the gear member is subjected.

In a copending application, Serial #679,060, filed December 7, 1923, by H. A. Houston and assigned to the Westinghouse Electric & Manufacturing Company, is disclosed a process of making gear rims having spring notches or landings which eliminates the difficulties theretofore encountered in the distortion and warping of the rim member during the heat-treating process. The notches were provided uniformly throughout the rim portion to equalize the internal stresses and reactions set up in the heat-treating operation.

My present invention is an improvement upon this process in that it provides, in addition to the foregoing, a means for obtaining different characteristics in the metal at the notched portion of the rim, which is subjected to greater wear than the main body portion, and in the toothed working portion of the rim structure, which is preferably subjected to another process of heat treatment.

I propose to machine or cut away the inner portion of the gear rim to provide a plurality of radial projections corresponding to the number of spring elements to be engaged with the rim member and then insert spring landing members between said projections, which members are secured to the rim portion as by welding or in any other suitable manner.

I have found that for a heat-treated rim it is fundamentally desirable that the greatest possible percentage of the developed length of the rim should be of uniform section and that departure from uniformity should be towards a stronger section rather than towards a weaker section because local deflections and stresses are unavoidable in a local relatively weak section in a much greater measure than occurs with a local relatively strong section. With my present design, it is possible to provide a rim having a major portion of its developed length of uniform relatively weak section and with the departure from uniformity toward stronger sections constituting the radial projections on the rim. I have found that with such a uniformly weak section, there is less deflection and stressing with the resultant distortion due to heat treatment than in a uniformly strong section such as has been heretofore utilized.

In the accompanying drawing constituting a part hereof and in which like reference characters designate like parts:

Fig. 1 is a view in side elevation of a gear rim embodying the principles of my invention, and Fig. 2 is an enlarged view of a fragmentary portion of a rim member mounted on an assembly jig.

Referring to Fig. 1, a gear rim 1, which is provided with gear teeth 2 on its outer periphery, is recessed on its inner portion or periphery to provide a plurality of radial projections 3. The recesses 4 between the successive projections are of such length as to constitute the major portion of the inner rim surface.

The rim 1, having the above-mentioned teeth and recesses formed therein, is subjected to a suitable heat-treating process and, if necessary it may be subsequently straightened by pressing, to return it to approximate circularity. The treated rim is then provided with insert or segment portions 5 having spaced channels or grooves 6 which constitute landings for the extended portions of spring elements that are carried in a familiar manner by the supporting hub portion of the gear-wheel (not shown).

The assembly of the segments or seating members 5 is accomplished by means of a suitable jig member constituting a rim portion 7 having pairs of radial extensions or fingers 8, corresponding to the spring elements of the hub member, which engage the channels 6 of the segments 5 for the purpose of holding them in proper spaced relation while the segmental portions are secured to the rim 1. The segments 5 are further held in place by a plurality of set-screws 9, extending through the jig rim 7.

Referring to Fig. 2, it will be seen that the recesses 4 between the projections 3 are of greater proportions than the overall length of the segments 5, this being for the purpose of permitting angular alignment of the segment members to obtain the proper spacing of the channels 6 by means of the projections 8 of the jig, thus permitting a wide range of manufacturing limits, not only in the machining of the segments 5 but also with respect to the spacing of the channels 6 in the segment members.

When all of the segments are clamped against the rim by the clamping jig as shown in Fig. 2, they are respectively secured to the rim member 1 by an arc or other deposition of metal 10, which fills the crevices or spaces between the ends of the segments and the corresponding projections 3 of the rim. The metal 10 is deposited in small proportions along the rim and segment members to gradually build up the space until the segments are firmly secured, thus preventing excessive heating at the point of welding, which might destroy the effect of the previous heat treatment of the rim and cause distortion thereof.

After the segments 5 are thus secured to the rim, the latter is released from the clamping jig by loosening the set-screws 9 and the rim is raised from the jig member to disengage the fingers 8 from the channels 6. The inner face of the ring is then ground and assembled upon the supporting hub, with the spring elements of the hub disposed in the landings 6 of the rim.

It is evident from the above description of my invention that gear rims made in accordance therewith are a substantial improvement over the prior art, in that the cost of machining the channels or landings for the spring elements is greatly reduced by utilizing the insert segment members, which permit of accurately locating the slots 6 in spaced relation without the expense of milling the slots in the rim by indexing each location of the slot for the milling operation. My construction further permits of heat treating the rim to obtain a certain characteristic of the metal and heat treating the insert members in an entirely different manner to make them suitable as spring landings.

Although I have described a specific embodiment of my invention, it will be obvious to those skilled in the art that various modifications may be made in the details and proportions of the several co-operating parts without departing from the principles herein set forth.

I claim as my invention:

1. A gear rim having a toothed outer periphery, recesses in its inner face and insert portions secured in the recesses, said insert portions being provided with indexed slots for mounting in the gear rim.

2. A gear rim having elongated recesses in its inner face, thereby providing a relatively small cross section to facilitate heat treating, and inserts having spring receiving channels secured in the recesses.

In testimony whereof, I have hereunto subscribed my name this 28th day of March 1924.

GEORGE M. EATON.